(12) United States Patent
Riabtsev et al.

(10) Patent No.: US 11,578,414 B2
(45) Date of Patent: Feb. 14, 2023

(54) METHOD FOR PRODUCING LITHIUM HYDROXIDE MONOHYDRATE FROM BRINES

(71) Applicant: Ecostar-Nautech Co., Ltd., Novosibirskaia oblast (RU)

(72) Inventors: Aleksandr Dmitriyevich Riabtsev, Novosibirsk (RU); Nikolay Mikhaylovich Nemkov, Novosibirsk (RU); Valeriy Ivanovich Titarenko, Novosibirsk (RU); Natalya Pavlovna Kotcupalo, Novosibirsk (RU); Andrey Aleksandrovich Kurakov, Novosibirsk (RU); Aleksandr Mikhailovich Kochnev, Moscow (RU)

(73) Assignee: Ecostar-Nautech Co., Ltd., Novosibirskai a oblast (RU)

( * ) Notice: Subject to any disclaimer, the term of this patent is extended or adjusted under 35 U.S.C. 154(b) by 397 days.

(21) Appl. No.: 17/025,733

(22) Filed: Sep. 18, 2020

(65) Prior Publication Data
US 2021/0087697 A1 Mar. 25, 2021

(30) Foreign Application Priority Data
Sep. 25, 2019 (RU) .......................... RU2019130117

(51) Int. Cl.
*C02F 1/28* (2006.01)
*C02F 1/42* (2006.01)
(Continued)

(52) U.S. Cl.
CPC .............. *C25B 1/20* (2013.01); *B01D 15/362* (2013.01); *B01D 61/58* (2013.01); *C02F 1/28* (2013.01);
(Continued)

(58) Field of Classification Search
CPC .... C02F 1/28; C02F 1/281; C02F 1/42; C02F 1/44; C02F 1/441; C02F 1/442;
(Continued)

(56) References Cited

U.S. PATENT DOCUMENTS

2018/0245180 A1* 8/2018 Cheng ................ B01J 20/28004
2019/0248667 A1 8/2019 Featherstone et al.
(Continued)

FOREIGN PATENT DOCUMENTS

| CL | 200900952 | 4/2010 |
|---|---|---|
| CL | 201800519 | 6/2018 |

(Continued)

OTHER PUBLICATIONS

Machine translation of RU 2656452 C2, retrieved Nov. 21, 2022 from ESpaceNet (Year: 2018).*
(Continued)

*Primary Examiner* — Jennifer Wecker
*Assistant Examiner* — Andrew Koltonow
(74) *Attorney, Agent, or Firm* — Calfee Halter & Griswold LLP

(57) ABSTRACT

A method for LiOHH$_2$O production from lithium-bearing multicomponent hydromineral raw materials includes filtering lithium-bearing brine contaminated with suspended particles with regeneration of filters and processing of used regenerate, and obtaining pregnant lithium-bearing brine, isolation of lithium chloride from the brine in the form of a primary concentrate in sorption-desorption modules, and nanofiltration of the primary lithium concentrate from magnesium, calcium and sulfate ions. By means of reverse osmosis, electrodialysis concentration and ion-exchange purification from impurities followed by thermal concentration, the primary lithium concentrate is converted into a pregnant lithium chloride concentrate which is converted
(Continued)

into a LiOH solution by membrane electrolysis. The LiOH solution is boiled down, resulting in LiOH.H$_2$O crystallization.

20 Claims, 8 Drawing Sheets

(51) Int. Cl.
| | |
|---|---|
| C02F 1/44 | (2006.01) |
| C02F 1/469 | (2006.01) |
| C22B 26/12 | (2006.01) |
| B01D 15/36 | (2006.01) |
| B01D 61/58 | (2006.01) |
| C25B 1/16 | (2006.01) |
| C01D 15/02 | (2006.01) |
| C25B 1/20 | (2006.01) |
| C25B 9/19 | (2021.01) |
| C02F 103/08 | (2006.01) |

(52) U.S. Cl.
CPC ............... *C02F 1/42* (2013.01); *C02F 1/441* (2013.01); *C02F 1/442* (2013.01); *C02F 1/4693* (2013.01); *C22B 26/12* (2013.01); *C25B 1/16* (2013.01); *C25B 9/19* (2021.01); *C01D 15/02* (2013.01); *C02F 2103/08* (2013.01); *C02F 2201/461* (2013.01)

(58) Field of Classification Search
CPC .... C25B 1/16; C25B 1/34; C25B 1/46; B01D 15/36; B01D 15/361; B01D 15/362; B01D 15/364; B01D 61/58; B01D 2221/04; B01D 37/03; B01D 2201/08; B01D 2321/12; C01D 15/02; C01D 15/04; C01D 15/08; C22B 3/24; C22B 3/42; C22B 3/44; C22B 26/12
See application file for complete search history.

(56) References Cited

U.S. PATENT DOCUMENTS

| | | | |
|---|---|---|---|
| 2019/0256987 A1 | 8/2019 | Snydacker et al. | |
| 2020/0306696 A1 | 10/2020 | Wang et al. | |
| 2021/0139339 A1 * | 5/2021 | Riabtsev | ................. B01J 45/00 |

FOREIGN PATENT DOCUMENTS

| | | | |
|---|---|---|---|
| CL | 202000748 | 2/2021 | |
| CN | 101928828 A | 12/2010 | |
| CN | 108660476 A | 10/2018 | |
| CN | 109368670 A | 2/2019 | |
| CN | 108660476 B | 4/2019 | |
| DE | 19772700748 | 9/1977 | |
| JP | 2018535309 A | 11/2018 | |
| RU | 2193008 C2 | 11/2002 | |
| RU | 2455063 C2 | 7/2012 | |
| RU | 2470861 C2 | 12/2012 | |
| RU | 2516538 C2 | 5/2014 | |
| RU | 2656452 C2 * | 6/2018 | |
| RU | 2656452 C2 | 6/2018 | |
| RU | 2659968 C1 * | 7/2018 | .............. B01J 39/07 |
| WO | 2009131628 A1 | 10/2009 | |
| WO | 2011132282 A1 | 10/2011 | |
| WO | 2015096549 A1 | 7/2015 | |
| WO | 2018/158041 A1 | 9/2018 | |
| WO | 2018190754 A2 | 10/2018 | |

OTHER PUBLICATIONS

European Search Report for the application 20198032.3 (dated Mar. 10, 2021).

* cited by examiner

METHOD FOR PRODUCING LITHIUM HYDROXIDE MONOHYDRATE FROM BRINES

CROSS-REFERENCE TO RELATED APPLICATIONS

This application claims priority to Russian Application No. RU 2019130117 filed on Sep. 25, 2019, the contents of which are hereby incorporated by reference as if recited in its entirety.

FIELD OF THE INVENTION

The present invention relates to lithium hydrometallurgy and can be used to produce lithium hydroxide monohydrate from natural brines.

BACKGROUND OF THE INVENTION

A method for producing lithium hydroxide from brines containing lithium, alkali metal and alkaline earth metal halides, after concentrating them in natural conditions, separating the majority of sodium and potassium chlorides and precipitation of calcium and magnesium at pH=10.5-11.5 is known in the art. After purification from calcium and magnesium, the concentrated solution containing up to 2-7% lithium is subjected to electrolysis, which is carried out in an electrolysis cell with a Nafion cation-exchange membrane which separates the anolyte from the catholyte, where lithium ions are transferred to the cathode chamber, producing LiOH. Chlorine and hydrogen are released during this process. In order to obtain high-purity lithium hydroxide monohydrate, it is crystallized from catholyte solution in which the content of impure cations does not exceed 0.5%. The mother liquor obtained after evaporation of the catholyte and separation of $LiOH.H_2O$ is subjected to carbonization by carbon dioxide in order to precipitate high-purity lithium carbonate, chlorine impurity of which does not exceed 0.005%. The released chlorine and hydrogen form hydrochloric acid by reacting with each other, which, as a result of exchange reaction with high-purity lithium hydroxide monohydrate, forms lithium chloride to produce high-purity metallic lithium (FRG patent No. 2700748.08.09.77) [1]. A method similar to the present solution in technical terms is the method for producing $LiOH.H_2O$ based on membrane electrolysis of a chloride solution produced in turn from lithium-bearing brines, including natural brines (RU 2470861, Sep. 4, 2009, published on 27 May 2014, bulletin 14) [2].

A common disadvantage of the above methods is the multistage production of the lithium chloride solution subjected to electrolysis, which is possible only in an arid climate using halurgic technology with stepwise separation of sodium and potassium chlorides and chemical impurities of calcium, magnesium and boron. The resulting lithium chloride solutions require further concentration using submersible gas combustion and re-precipitation of Ca and Mg impurities using LiOH and $Li_2CO_3$. Therefore, it is necessary to perform chemical cleaning twice and filter the brine multiple times during concentration. Further, in order to produce the required amount of pregnant LiCl solution, it is necessary to purify very large volumes of initial brines, which leads to high consumption of reagents and formation of large volumes of solid waste, and to concentrate the initial lithium-bearing brines highly in terms of lithium chloride content, usually with salinity of over 200 $kg/m^3$, which requires high capital investments, high power consumption during production and the inevitable salting out of a huge mass of salts in the form of NaCl and NaCl mixed with KCl, which are not in demand on the market. For lithium-bearing brines with high calcium and magnesium content, up to 50-70% of the total sum of salts, such as deep brines of the Siberian platform and lake brines of the Qinghai province in China, the use of halurgic technology to obtain a pregnant LiCl solution is fundamentally impossible.

For lithium-bearing brines with high calcium and magnesium content, a technology for sorption enrichment of brines with lithium has been developed, the technology including a method for producing a primary lithium concentrate in the form of a lithium chloride solution and an apparatus for the production thereof (RU 2516538, Feb. 17, 2012, published May 20, 2014, bulletin 14) [3]. The technology provides sorption-based production of lithium concentrate, its further enrichment and concentration, but the apparatus lacks a converter for producing a LiOH solution from a lithium chloride solution. The technology of sorption-based separation of lithium chloride from lithium-bearing brines proved to be effective not only in terms of lithium-bearing brines with high calcium and magnesium content but also in terms of conventional multi-component highly mineralized lithium-bearing brines of sodium chloride type with low initial calcium and magnesium content. For selective sorption of LiCl from brines, the DGAL-Cl granular sorbent is used (RU 2455063, Oct. 13, 2010, published Jul. 10, 2014, bulletin 19) [4], which is based on a double compound of aluminum and lithium ($LiCl.2Al(OH)_3.mH_2O$) with a structural lithium deficiency, the compound being capable of selective sorption of LiCl from a saturated sorbent into fresh water. Based on the use of a selective granular sorbent, a method for producing lithium hydroxide from brines and an apparatus for implementation thereof have been developed (RU 2193008, Mar. 25, 1998, published Nov. 20, 2002, bulletin 32) [5]. According to the method, the solution of lithium chloride is produced in a U-shaped column by selective sorption of lithium chloride from brines and desorption of LiCl using water, followed by concentration of the LiCl solution in the same column by repeated processing of the lithium-saturated sorbent at the sorption stage using circulating LiCl solutions produced during the previous desorption process. Desorption of LiCl from the saturated sorbent is carried out at a ratio of the circulating solution volume to the sorbent volume of 1.5:1.0. Desorption of LiCl using circulating lithium chloride solutions allows to increase the concentration of LiCl from 0.5-3.0 $kg/m^3$ to 11.0-17.0 $kg/m^3$. The concentrated LiCl solution is subjected to ion-exchange purification from Ca and Mg impurities on a KU-2 cation exchanger in the Li-form, followed by regeneration thereof using a lithium chloride solution. The resulting purified LiCl solution enters the electrochemical conversion stage in order to produce a LiOH solution. Chlorine released at the anode is absorbed in the presence of urea by the mother liquor of LiOH formed after $LiOH.H_2O$ crystallization.

After electrolysis of lithium chloride, the anolyte proceeds to the stage of desalting thereof to a LiCl concentration of 0.5-3.0 $kg/m^3$, which is used at the stage of lithium desorption from the sorbent. All of the above procedures are carried out in one U-shaped column filled with a granular sorbent based on $LiCl.2Al(OH)_3.mH_2O$ and selective to lithium. The column is equipped with a device for reverse circulation of the washing liquid and a bypass system for returning the desorbing liquid to the desorption area. All processes are carried out in a stepwise countercurrent mode.

The apparatus further comprises a column filled with the KU-2 cation exchanger in Li-form for purification of the lithium chloride solution from Ca and Mg impurities. After purification and concentration to 70-100 g/m$^3$, the lithium chloride solution is used at the cation exchanger regeneration stage.

The apparatus for the conversion of lithium chloride to hydroxide consists of a membrane electrolyzer and an electrodialyzer/filter-press desalter for obtaining a desalted solution, an absorber for capturing chlorine, a crystallizer for producing LiOH.H$_2$O and a centrifuge for separating crystals from the mother liquor used for absorbing chlorine. The process of converting LiCl to LiOH is carried out in an electrolyzer operating in a galvanostatic mode at a current density of 0.25-0.95 kA/m$^2$ supplied with a lithium chloride solution of 18 kg/m$^3$. The resulting lithium hydroxide solution is concentrated to 60-80 kg/m$^3$. The anolyte with LiCl content of 6.5-6.7 kg/m$^3$ is subjected to desalination to 0.5-3.0 kg/m$^3$ of LiCl.

The electrolyzer for converting lithium chloride has an anode made of a corrosion-resistant material; in this case, platinum or titanium coated with iridium or platinum was used, and stainless steel was used as the cathode. The electrolyzer is equipped with intermediate electrodes made of iridized titanium foil and with MK-40 or MK-41 membranes. Chlorine released at the anode during electrolysis is directed to a gas separator and then to an absorber for its absorption by the mother liquor after LiOH.H$_2$O crystallization. Excess chlorine is captured using the original bromine-containing brine where the bromide ion is oxidized to elemental bromine, and gaseous bromine is stripped and condensed to a liquid state.

The disadvantages of the method include the following:

1) the lithium chloride solution is concentrated directly in the sorption-desorption column, which leads to the production of a lithium chloride solution with concentration of 16-18 kg/m$^3$ at most;

2) obtaining diluted LiOH solutions due to the large transfer of water during the electrolysis of low-concentrated LiCl solutions;

3) low current density due to the use of diluted lithium chloride solutions in the electrochemical conversion process and, consequently, low processing rate;

4) the obtained product is characterized by high content of sodium and potassium impurities;

5) high sorbent wear during movement along the column.

The above disadvantages are eliminated in the method for producing LiOH.H$_2$O from brines (RU 2656452, Apr. 2, 2016, published 5 Jun. 2018, bulletin 16) by implementing the following technical solutions on which the disclosed method is based:

producing primary lithium concentrate in columns with a fixed bed of granular sorbent, which allows to reduce sorbent loss by an order of magnitude;

concentrating the primary lithium concentrate highly prior to electrochemical conversion, which is achieved by a combined method including reverse osmosis up to total salt content of 60 kg/m$^3$ in combination with electrodialysis up to 190-205 kg/m$^3$ for LiCl and thermal processing up to 450 kg/m$^3$ for LiCl;

purifying the reverse osmosis lithium concentrate from Ca and Mg impurities using a chemical treatment method;

performing deep ion-exchange purification of the electrodialysis lithium concentrate from calcium and magnesium;

removing impurities in the form of NaCl and KCl using deep thermal concentration;

performing chemical purification of the anolyte from sulfate ions;

performing the electrolysis process at a current density of 0.9-1.2 kA/m$^2$ by maintaining the concentration of LiCl in the circulating anolyte at 115-125 kg/m$^3$.

The implementation of the proposed technical solutions allows to increase the processing rate of producing lithium hydroxide monohydrate with a simultaneous purity increase and, as a consequence, to increase the economic performance of the method.

However, the above method used as the prior art for the present invention has a number of significant disadvantages, namely:

in industrial operation of the prior art technology for producing LiOH.H$_2$O from natural brines based on sorption-desorption separation of lithium chloride concentrate from raw lithium-bearing hydromineral material, gradual overgrowth of the active surface of drainage devices of the sorption columns with particles of solid-phase impurities present in the compositions of the original natural brines was noted, and therefore it is necessary to stop the process, unload the sorbent, flush the drainage devices and the unloaded sorbent from foreign impurities thus reducing specific throughput of the equipment;

an increased residual content of brine macrocomponents in the primary lithium concentrate separated from the brine and large lithium loss along with the washing liquid due to flaws in the procedure of removing brine from the sorbent layer prior to lithium chloride desorption;

exclusively chemical removal of impurities from the primary lithium concentrate leading to increased chemical reagent consumption;

increased consumption of the obtained LiOH.H$_2$O and HCl products for in-house needs;

low concentration of the produced hydrochloric acid solution;

complication of the technological process by carrying out the procedure of chemical purification of lithium concentrate in two stages: purification of the chloride lithium concentrate from calcium and magnesium following the reverse osmosis concentration procedure and purification of the anolyte from sulfate ions directly during electrolysis;

the presence of a fine fraction of aluminum-containing sorbent in the flow of lithium-spent mother liquor, which complicates brine recycling.

The present method for producing high-purity lithium hydroxide monohydrate from multicomponent lithium-bearing brines retains all advantages and eliminates the above disadvantages of the prior art method.

SUMMARY OF THE INVENTION

The technical result allowing to eliminate said disadvantage is achieved by the present method wherein: prior to selective extraction of LiCl from the original multicomponent lithium-bearing brine using granular sorbent DGAL-Cl, the brine is purified from solid-phase impurities by filtering, thus obtaining pregnant lithium-bearing brine, the primary stream of which is directed to selective extraction of LiCl, and a preset part of the flow is used to regenerate used filters, the obtained used filter regenerate is supplied for clarification, the clarified regenerate is mixed with the original multicomponent lithium-bearing brine directed to filtering, the thickened regenerate is subjected to sedimentation centrifugation, mixing the produced centrate with the clarified regenerate flow, which is in turn supplied for mixing with the original multicomponent natural lithium-bearing brine, and the discharged sediment of solid-phase impurities is buried;

the pregnant lithium-bearing brine is passed in filtration mode through a layer of granular sorbent in the column until a breakthrough LiCl concentration is achieved in the flow at the column outlet, filtration of the brine through a layer of granular sorbent saturated with LiCl is stopped, the pregnant brine remaining in the column is displaced from the column by the first portion of the circulating lithium-containing washing liquid being filtered through the sorbent layer in portions, and is mixed with the pregnant lithium-bearing brine, the amount of the portion is determined by the preset level of residual content of macrocomponents of the brine in the sorbent in the column, wherein fresh water is used for the last portion of the washing liquid, the first portion of the used lithium-containing washing liquid in the column is displaced by a second portion of lithium-containing washing liquid and further mixed with the pregnant lithium-bearing brine, and the second and subsequent portions of lithium-containing washing liquid are used in the next cycle of displacement of the brine from a layer of a granular sorbent saturated with LiCl, wherein the primary lithium concentrate in the form of an aqueous solution of lithium chloride containing brine macrocomponents in the form of impurities is produced by filtering a preset volume of fresh water through the sorbent layer in the column following the completion of the pregnant brine removal stage;

the resulting flow of primary lithium concentrate is decarbonized by acidification and directed for nanofiltration for non-reactive purification from the bulk of impurities in the form of magnesium, calcium and sulfate ions, wherein the main flow of the primary lithium concentrate purified by nanofiltration from calcium and sulfate ions and enriched with lithium is directed for concentration by reverse osmosis, while the waste flow enriched with magnesium and calcium is mixed with the pregnant lithium-bearing brine;

the flow of electrodialyzed lithium chloride concentrate formed after concentration of reverse osmosis lithium concentrate by electrodialysis is subjected to chemical purification from calcium and magnesium and sulfate ions by mixing it with a lithium bicarbonate solution produced by treating a preset volume of used boiled-down catholyte with carbon dioxide, the used boiled-down catholyte, used alkaline regenerate and barium chloride; the chemically purified electrodialyzed lithium chloride concentrate is separated from the formed precipitate of impurities by filtering. The precipitate is washed with demineralized water, and the resulting used washing solution is mixed with the main flow of the primary lithium concentrate purified by nanofiltration. After acidification with hydrochloric acid to the pH of 6 . . . 8, the chemically purified electrodialyzed chloride concentrate is directed for deep ion-exchange purification from residual impurities, wherein the used acidic regenerate formed as a result of acid regeneration of the used ion exchanger as an auxiliary acidifying agent in decarbonization of the primary lithium concentrate prior to its nanofiltration, and wherein the ion exchanger Lewatit 208-TP regenerated with a hydrochloric acid solution is converted to the Li-form using a preset volume of used boiled-down catholyte, and wherein the resulting used alkaline regenerate is directed as a reagent for chemical purification of the electrodialyzed chloride lithium concentrate;

the flow of used anolyte output during electrolysis and containing sulfate ions is directed as the main acidifying agent for decarbonization of the primary lithium concentrate;

the separation of NaCl, KCl and $Na_2B_4O_7 \cdot 10H_2O$ crystals salted out from the lithium chloride concentrate that has passed deep ion exchange purification and electrodialysis is carried out by centrifugation followed by washing with a preset volume of demineralized water from the remaining lithium-containing mother liquor introduced during the boiling down of the purified electrodialyzed lithium chloride concentrate and by mixing the formed used lithium-containing chloride washing solution with purified electrodialyzed lithium chloride concentrate prior to boiling down thereof;

concentrated hydrochloric acid is produced by water absorption when cooling hydrogen chloride produced by burning the flow purified from residues of cathodic hydrogen catholyte in a flow of anode chlorine purified from anolyte;

in order to reduce the consumption of hydrochloric acid produced for in-house needs by processing used boiled-down catholyte into high-purity commercial lithium carbonate, after using preset volumes of the used boiled-down catholyte to convert the Lewatit-208-TP ion exchanger into the Li-form, alkalinizing the electrodialyzed lithium concentrate to a predetermined pH value during chemical purification, the catholyte is directed for mixing with a bicarbonate circulating solution containing $NaHCO_3$, $KHCO_3$ and $LiHCO_3$; the $Li_2CO_3$ slurry formed during mixing in the carbonate solution is concentrated by removing a preset amount of water from the pulp in the form of vapors by bubbling a predetermined volume of atmospheric air heated above 100° C. through the pulp; the solid phase of the produced lithium carbonate is separated from the boiled-down carbonate solution containing $Na_2CO_3$, $K_2CO_3$ and $Li_2CO_3$ by centrifugation; the carbonate solution is treated with carbon dioxide until the carbonates are fully converted into bicarbonates; the resulting precipitated sodium and potassium bicarbonates are filtered off and the circulating bicarbonate solution is directed for mixing with the used boiled-down catholyte; the precipitated sodium and potassium bicarbonates are filtered off and washed with demineralized water; the resulting used lithium-containing bicarbonate washing solution is directed for mixing with the used boiled-down catholyte; the thus produced lithium carbonate is washed with demineralized water, thus obtaining, after drying and packaging, commercial high-purity lithium carbonate, the used lithium-containing carbonate washing solution formed as a result of washing the $Li_2CO_3$ is directed for mixing with the used boiled-down catholyte, the circulated bicarbonate solution and used lithium-containing bicarbonate washing solution and for concentration by boiling down or directed for chemical purification of the electrodialyzed lithium concentrate; the produced $NaHCO_3$ and $KHCO_3$ crystals are decarbonized with a hydrochloric acid solution thus forming a chloride solution and are mixed with the lithium-free mother liquor formed during selective sorption of LiCl or dried and used for in-house needs;

the fine fraction of the DGAL-Cl sorbent contained in the flows of the lithium-free mother liquor displaced from the sorbent layer of the pregnant lithium brine and the used lithium-containing washing liquid is removed by filtering the flows on fine filters, and fine particles of the selective DGAL-Cl sorbent captured on the filters are recycled for production of granular sorbent.

The advantages of the disclosed solutions compared to the prior art method include:

1. Eliminating the risk of reducing processing rate of sorption separation on a lithium chloride-selective granular sorbent of primary lithium concentrate from lithium-bearing multicomponent brines containing solid-phase impurities and expanding the range of lithium-bearing hydromineral raw sources suitable for the production of high-purity lithium hydroxide monohydrate;

2. Reducing the content of impurities in the primary lithium concentrate separated from lithium-bearing brines.

3. Reducing operational costs of high purity $LiOH.H_2O$ production from lithium-based multicomponent brines;

4. Allowing for production of commercial battery-grade lithium carbonate with purity over 99.99% from lithium-bearing multicomponent brines along with the battery-grade lithium monohydrate;

5. Allowing for production of concentrated hydrochloric acid instead of a 20% solution thereof as a by-product;

6. Reducing consumption of $LiOH.H_2O$ and concentrated HCl products for in-house needs.

The information confirming the possibility of implementing the disclosed invention is presented in FIGS. 1A-1H and in the examples.

Following is a description of the implementation of the proposed method.

Figure 1A:
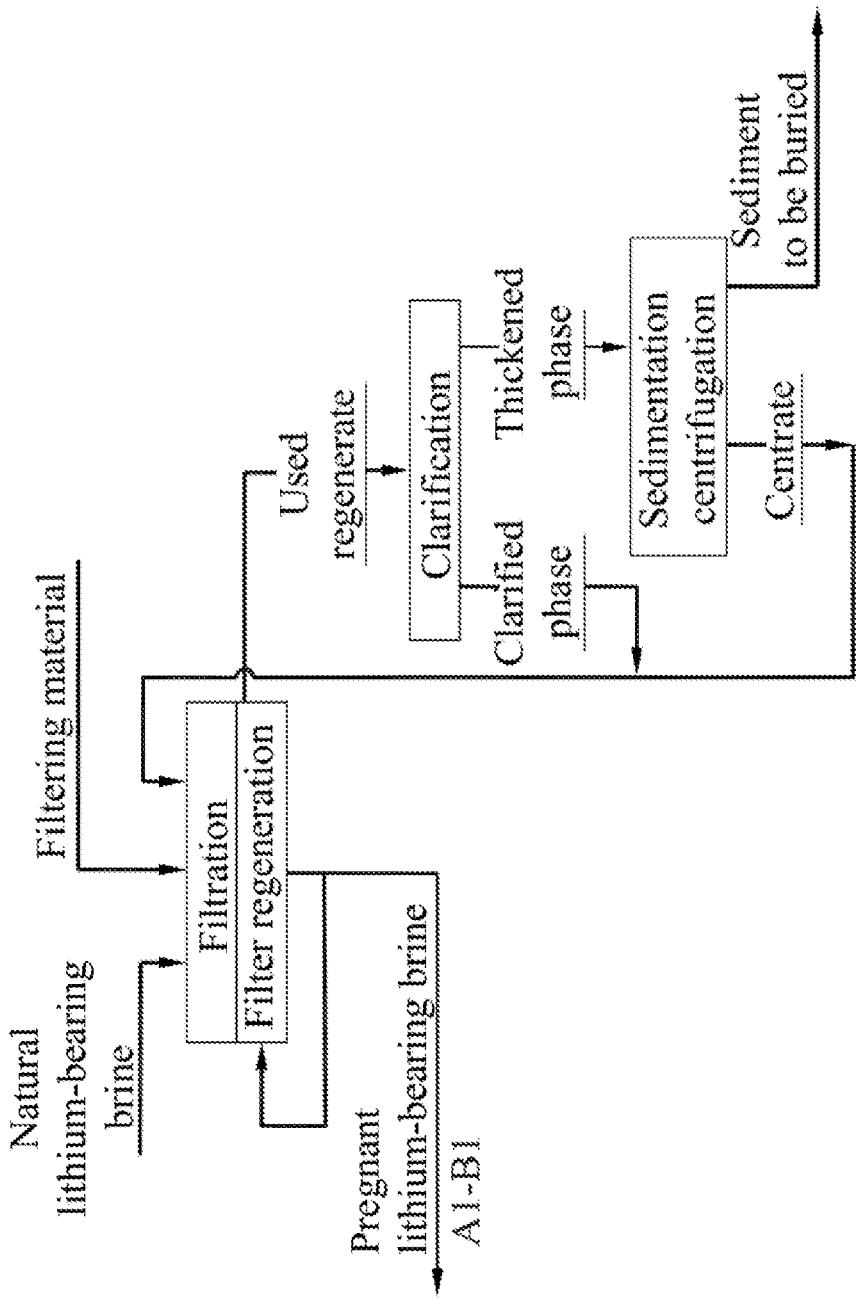
FIGS. 1A-1H show flow diagrams illustrating production of lithium hydroxide monohydrate from lithium-bearing multicomponent brines.
Figure 1B:
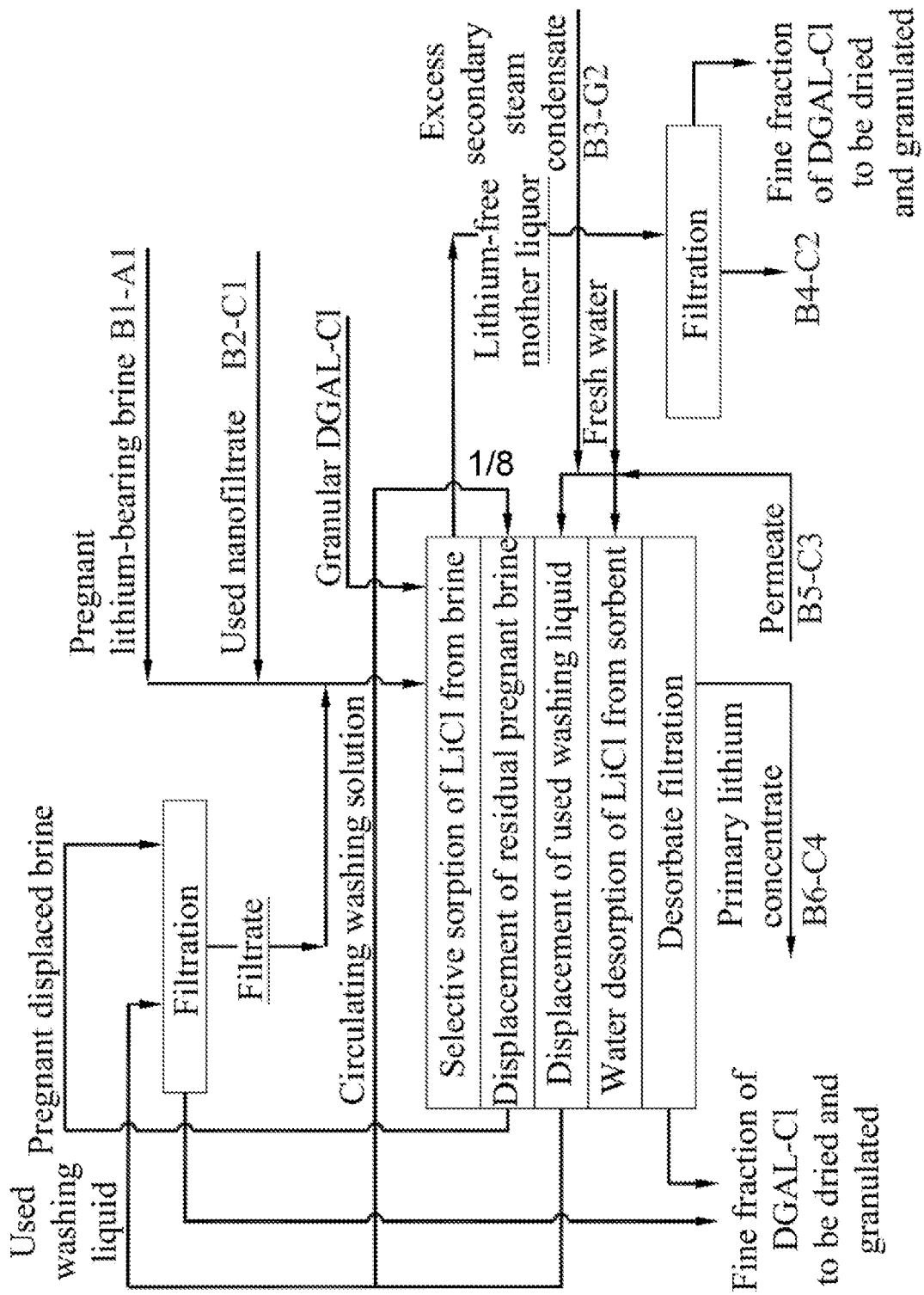
Figure 1C:
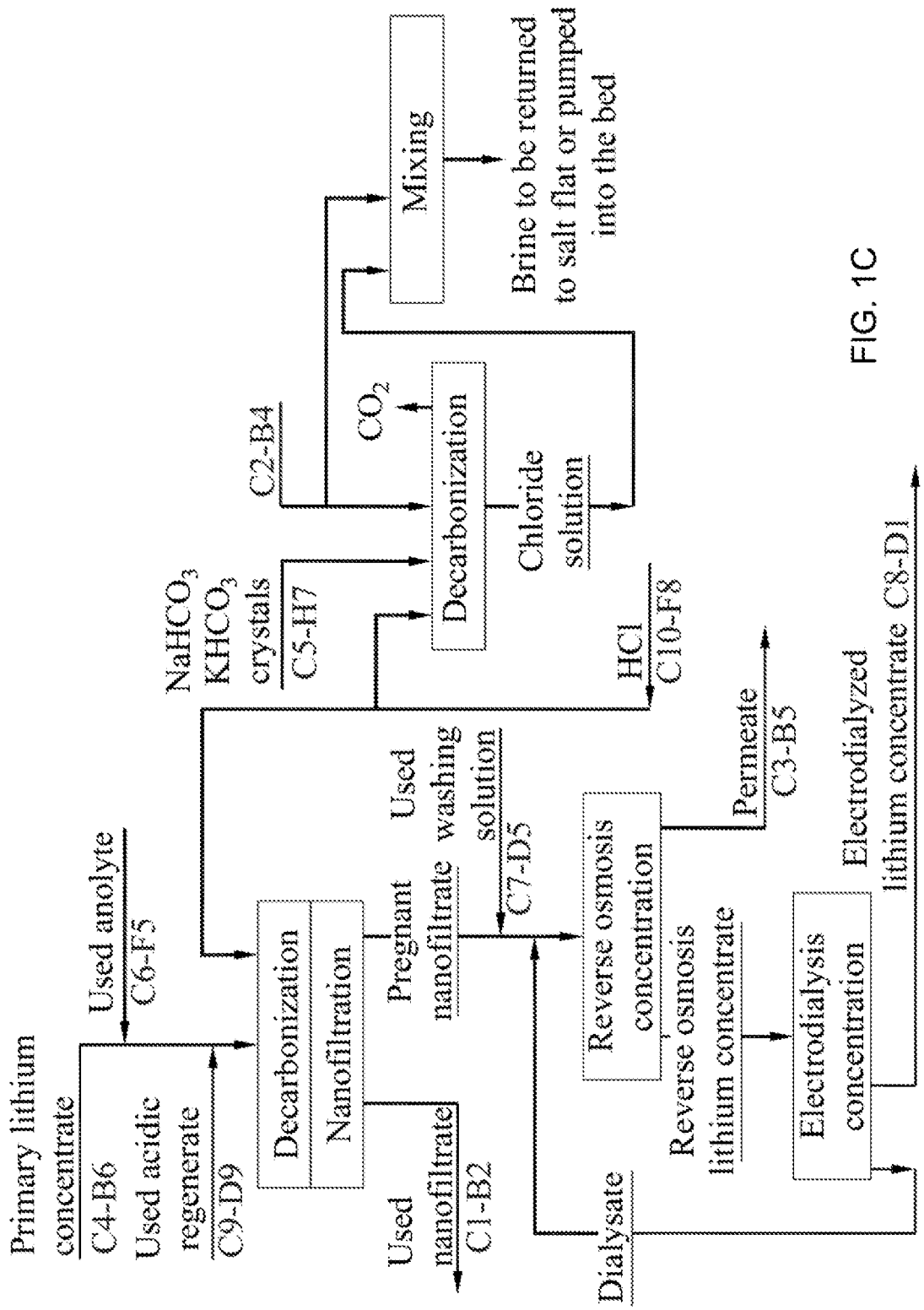
Figure 1D:
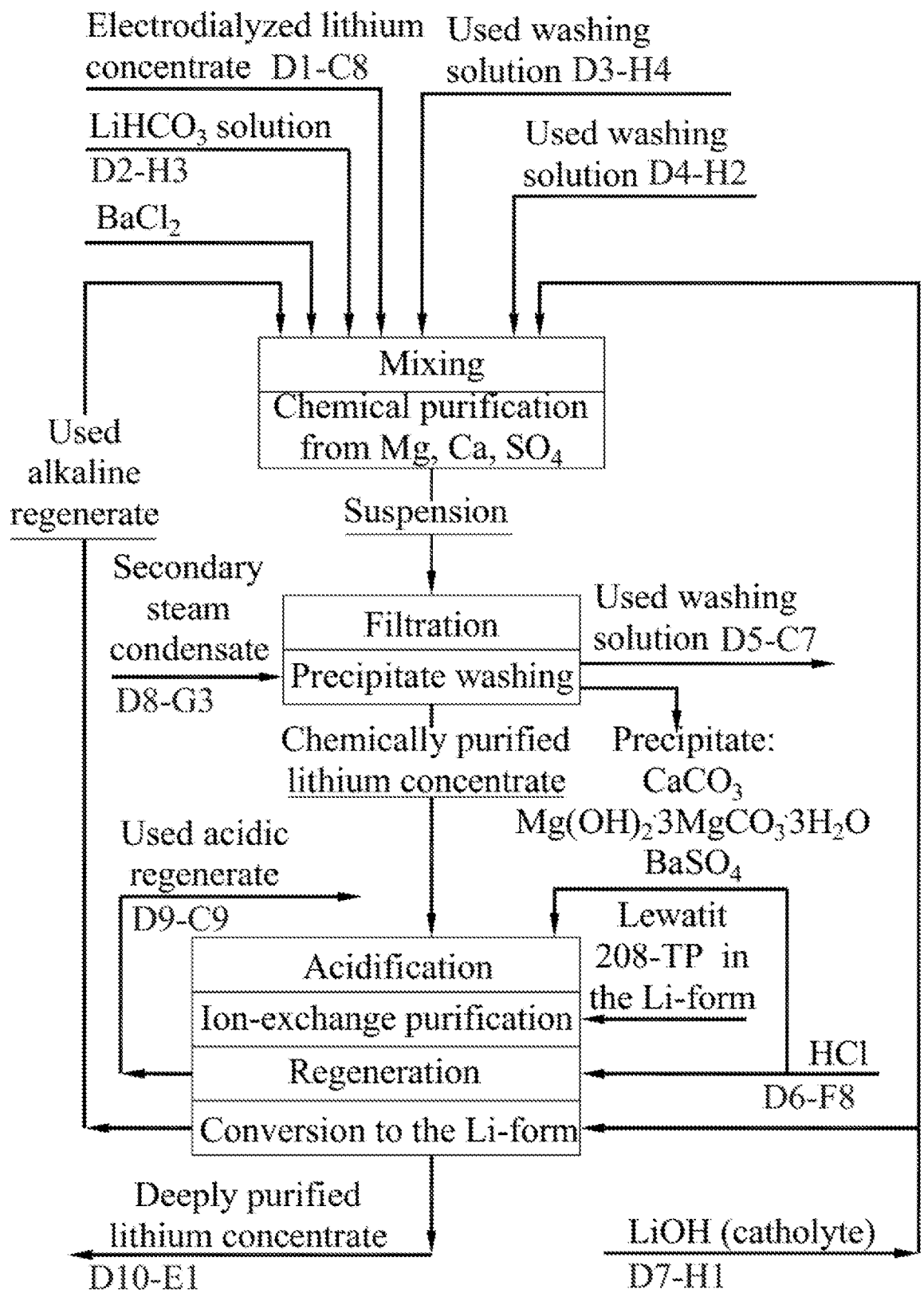
Figure 1E:
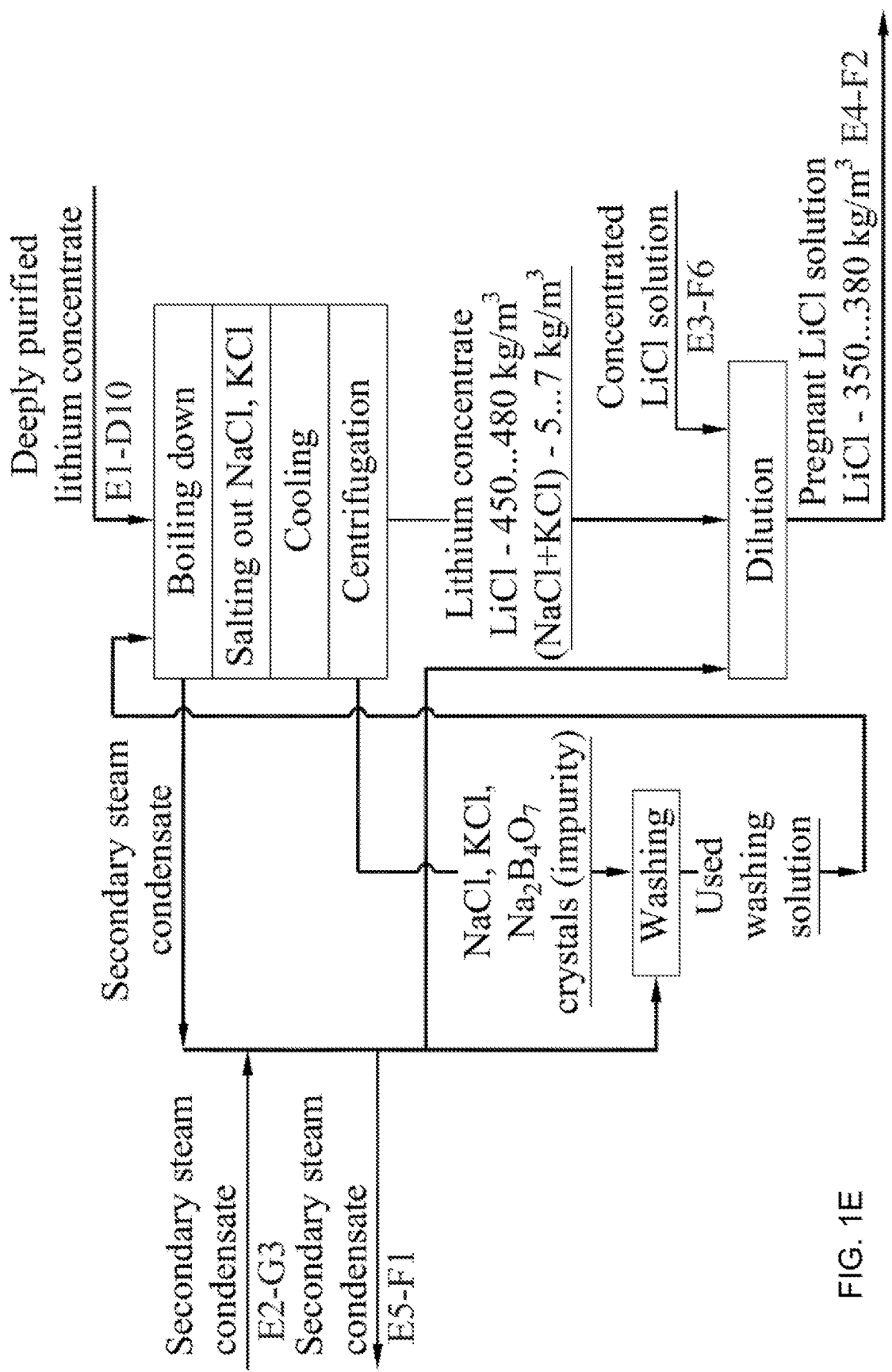
Figure 1F:
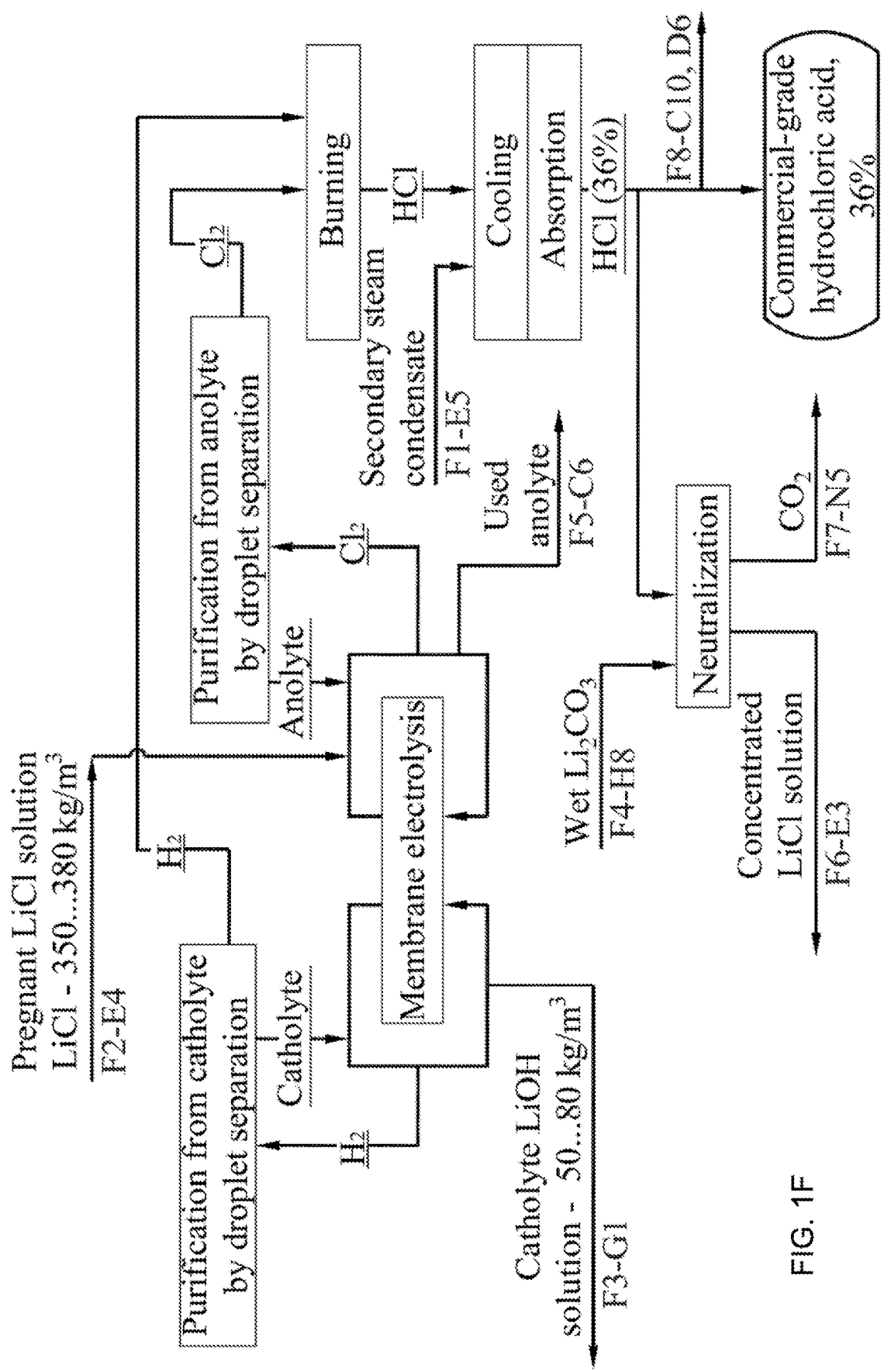
Figure 1G:
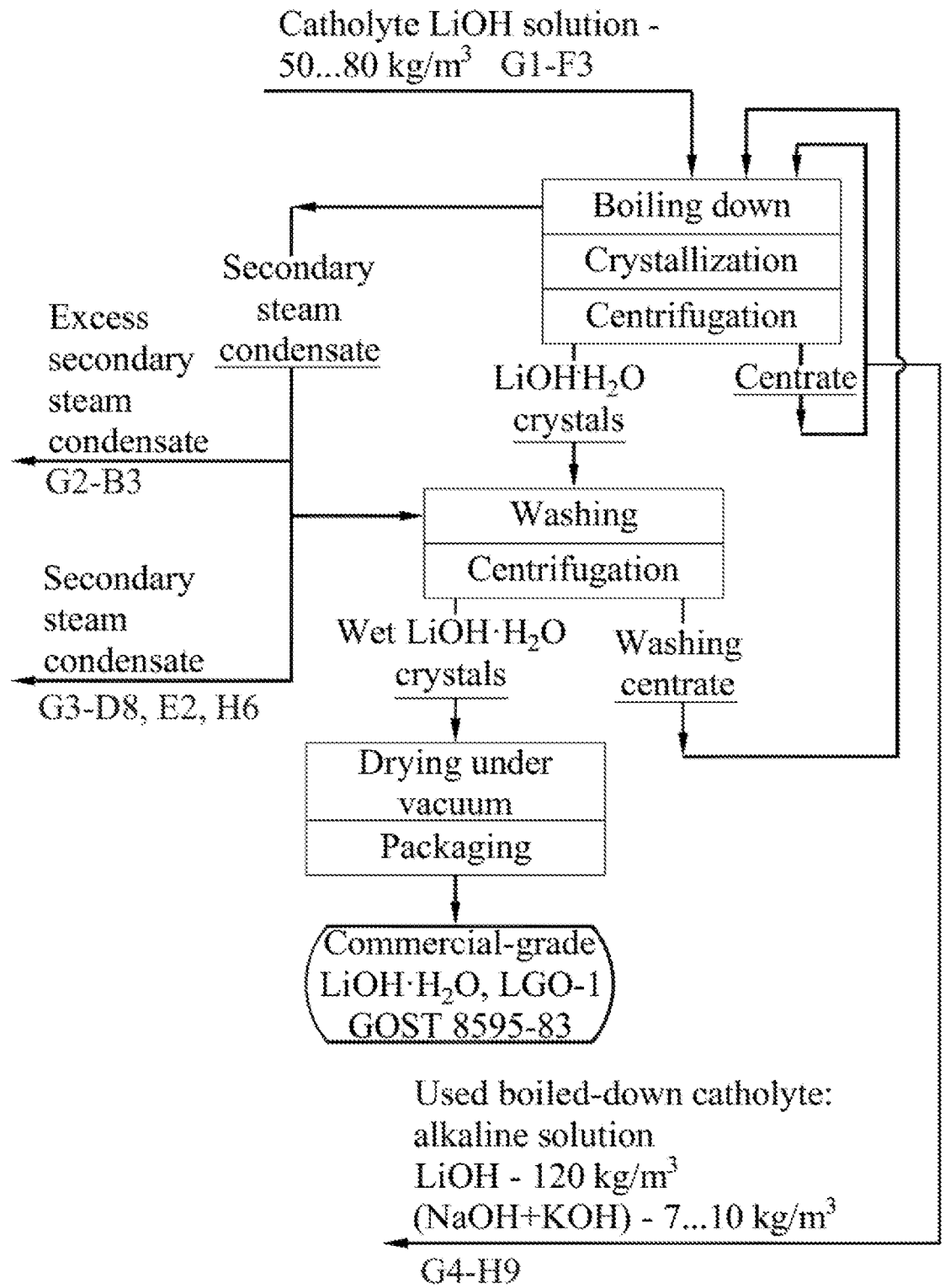
Figure 1H:
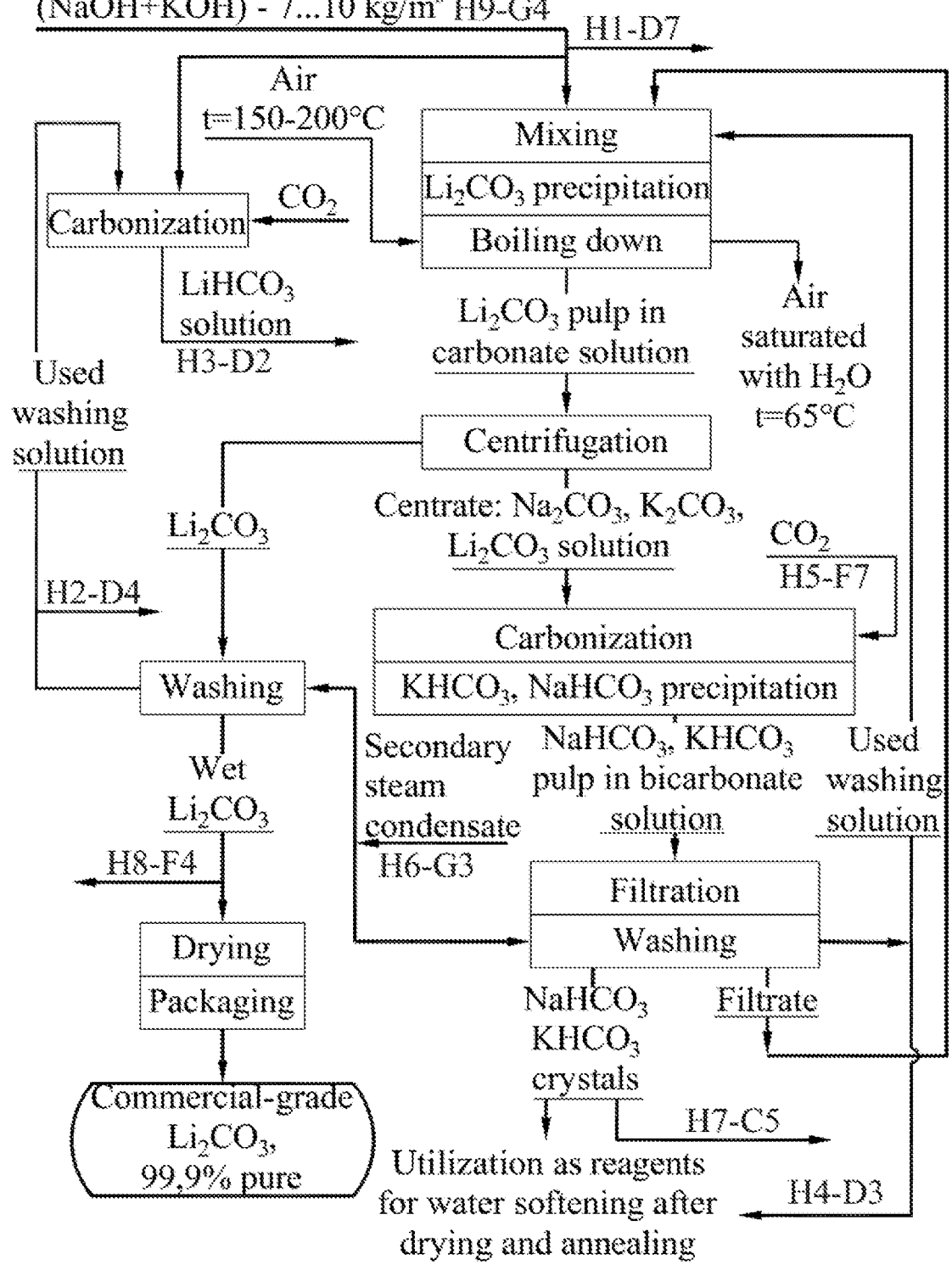

The implementation of the proposed invention is carried out in accordance with the sequence and relationship of technological procedures presented in the framework of the general flow diagrams (FIGS. 1A-1H) for the production of $LiOH.H_2O$.

In accordance with the disclosed diagram, the original natural lithium-bearing brine containing suspended particles of solid-phase impurities is filtered in a filtration apparatus consisting of regenerable fine filters and producing a pregnant lithium-bearing brine practically free of solid-phase impurities. As the collected particles accumulate in the filters of the filtration apparatus up to the maximum waste holding capacity for the filters used, the filters are successively regenerated by a pulsed countercurrent supply of the pregnant lithium-bearing brine. The used filter regenerate is a slurry with a solid phase content of at least 5-7% wt. and is directed for thickening. The clarified portion of the regenerate is recycled for filtration and, after mixing with the original natural lithium-bearing brine, the thickened portion of the regenerate is subjected to precipitation centrifugation, e.g. in turbo decanters. The precipitation separated from the liquid phase of the brine is buried and the centrate is mixed with the clarified portion of the regenerate being recycled for filtration. Then the pregnant lithium-bearing brine is directed for selective isolation of lithium chloride to the sorption-desorption complex consisting of column-type apparatuses filled with DGAL-Cl granular sorbent which is selective to the lithium chloride contained in the brine. The sorption-desorption complex operates in the following mode: part of the columns perform sorption while another part of the columns are being regenerated. At the stage of selective sorption, the lithium-bearing pregnant brine is passed through the sorbent in columns in filtration mode in a volume that provides a preset degree of saturation of the sorbent with LiCl at a preset degree of extraction from the brine. The lithium-depleted mother liquor is required to be filtered, freeing it from small sorbent particles carried out with the brine from the column during the sorption process. Columns with a saturated sorbent are switched to regeneration mode. Sorbent regeneration consists of the stage of removal from the column and returning for sorption of the brine with a composition close to that of the pregnant brine and the stage of desorption of LiCl from the sorbent freed from brine.

The brine is removed stepwise using portions of lithium-containing washing liquid, consisting of macrocomponents of brine and lithium, the content of which in the washing portions changes step by step. The content of macrocomponents significantly decreases from one washing to another while the lithium content changes insignificantly and is at the level of its content in the pregnant lithium-bearing brine. The number of steps is determined based on the specified depth of removal of macrocomponents of the brine and on the permissible lithium chloride loss from the sorbent at the brine removal stage. The lithium-bearing brine displaced from the column by the first portion of the washing liquid is filtered before mixing with the pregnant brine, thus removing small sorbent particles. The first portion of the washing liquid, the closest in composition to the pregnant brine, is displaced by the second portion of the displacing liquid and is also directed for mixing with the pregnant brine after filtering. The second portion of the washing liquid is displaced by the third and left in circulation for the next cycle. All subsequent portions of the washing liquid are also circulating. The last portion of the displacing fluid is fresh water. It is displaced from the column at the desorption stage, and it becomes the penultimate circulating portion of the washing liquid. The disclosed system for removing brine from columns with sorbent allows to reduce the level of impurities in the primary lithium concentrate by 8-12% compared to the prior art solution.

After the brine removal stage is complete, the columns proceed to the LiCl desorption stage from the sorbent to obtain an intermediate product in the form of a primary lithium concentrate in the form of an aqueous solution containing 4-6 $kg/m^3$ of lithium chloride and residual macrocomponents of the pregnant lithium-bearing brine in amounts depending on the depth of brine removal in the previous stage. Desorption is also carried out stepwise using portions of fresh water. The volume of fresh water is determined by a preset degree of lithium desorption at a preset average LiCl content in the primary lithium concentrate.

The resulting primary lithium concentrate is mixed with the used acidic sulfate-containing anolyte removed from the process during membrane electrolysis, the used acidic regenerate formed during the ion-exchange purification of the electrodialyzed lithium concentrate. As a result of acidification of the primary lithium concentrate, the destruction of carbonates and bicarbonates introduced with fresh water during the production of the primary lithium concentrate occurs. The decarbonization process is described by the following chemical reactions:

$$CO_3^{2-}+2H^+\rightarrow CO_2\uparrow+H_2O \quad (1)$$

$$HCO_3^-+H^+\rightarrow CO_2\uparrow+H_2O \quad (2)$$

Next, the mixed decarbonized and acidified flow of the primary lithium concentrate containing magnesium, calcium and sulfate ions as impurities is directed to the nanofiltration unit by passing it through filter elements under pressure of over 50 atm. As a result of nanofiltration, two flows are formed. The used small lithium-containing flow enriched with magnesium, calcium and sulfate ions is directed for mixing with the pregnant lithium-bearing brine.

Nanofiltration purification of the primary lithium concentrate allows to remove the bulk of impurities without incurring reagent costs. Generally, the degree of removal is 90-93% for magnesium, 63-65% for calcium, and over 90% for sulfate ions. The primary lithium-containing flow enriched in lithium chloride is directed to the reverse osmosis concentration/desalination apparatus where it is divided into the main (by liquid phase volume) flow (permeate) consisting of demineralized water with residual salt content of under 50 g/m³, which is directed for desorption of LiCl from the sorbent using fresh water, and a smaller by volume but LiCl-concentrated flow which is the reverse osmosis lithium concentrate with total salt content of 50-60 kg/m³ directed for concentration by electrodialysis which also outputs two flows. The largest flow by volume is the dialysate with residual salt content of 8-12 kg/m³, which is directed for mixing with pregnant nanofiltrate of decarbonated primary lithium concentrate supplied to reverse osmosis concentration/desalination, and a smaller by volume but LiCl-concentrated flow which is the electrodialyzed lithium concentrate directed for chemical purification from calcium, magnesium and sulfate ions. The used boiled-down catholyte, a lithium bicarbonate solution of a preset concentration and the used alkaline-carbonate washing solutions are used as reagents therefor. As a result of mixing, the acid is neutralized and an alkaline medium is created with pH=10.5-11.0, carbonate ions are formed from bicarbonate ions, and calcium and magnesium are precipitated in the form of insoluble compounds. The chemical purification process is described by the following chemical reactions:

$$H^++OH^-\rightarrow H_2O \quad (3)$$

$$HCO_3^-+OH^-\rightarrow CO_3^{2-}+H_2O \quad (4)$$

$$Ca^{2+}+CO_3^{2-}\rightarrow CaCO_3\downarrow \quad (5)$$

$$4Mg^{2+}+2OH^-+3CO_3^{2-}+3H_2O\rightarrow Mg(OH)_2\cdot 3MgCO_3\cdot 3H_2O\downarrow \quad (6)$$

If necessary, residual sulfate is removed by precipitation using barium chloride as a reagent according to the following reaction:

$$SO_4^{2+}+BaCl_2\rightarrow BaSO_4\downarrow+2Cl^- \quad (7)$$

The LiHCO₃ solution is used to rapidly provide the required concentration of carbonate ions in the reaction medium which cannot be achieved by introducing poorly soluble lithium carbonate.

The lithium bicarbonate solution is produced by processing a preset volume of used boiled-down catholyte containing NaOH and KOH as impurities, which is extracted from the catholyte (alkaline) circuit of membrane electrolysis according to the following reaction:

$$2LiOH+CO_2\rightarrow Li_2CO_3\downarrow+H_2O \quad (8)$$

$$Li_2CO_3+CO_2+H_2O\rightarrow 2LiHCO_3 \quad (9)$$

$$NaOH+CO_2\rightarrow NaHCO_3 \quad (10)$$

$$KOH+CO_2\rightarrow KHCO_3 \quad (11)$$

The resulting precipitates of impurities are removed from the flow of the chemically purified electrodialyzed lithium chloride concentrate by filtering, then they are washed with demineralized water and the used washing solution is mixed with the pregnant nanofiltrate prior to its concentration by reverse osmosis. The solution of the chemically purified electrodialyzed lithium concentrate is then directed for deep ion-exchange purification from the remaining Ca²⁺ and Mg²⁺ cations on the Lewatit-208-TP ion exchanger in Li-form. The ion-exchange purification process is described by the following reactions:

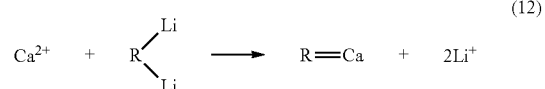

$$\quad (12)$$

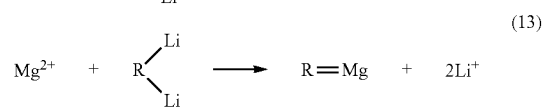

$$\quad (13)$$

The used ion exchanger is regenerated by an HCl solution according to the following reaction:

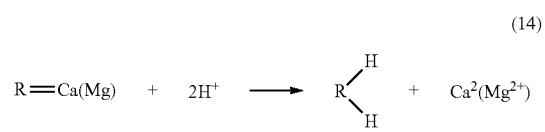

$$\quad (14)$$

The used acidic regenerate is directed for decarbonization of the primary lithium concentrate. Then the ion exchanger is converted from the H-form into the Li-form by treatment with an alkaline LiOH solution which is provided by a preset volume of used boiled-down catholyte according to the following reaction:

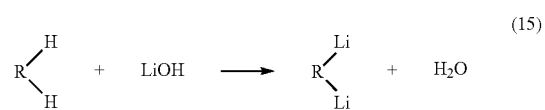

$$\quad (15)$$

The used alkaline regenerate is used in chemical purification of the electrodialyzed lithium chloride concentrate.

The use of the boiled-down used catholyte in the above procedures allows to reduce the consumption of LiOH.H₂O for in-house needs by 7-10% compared to the prior art solution.

Then the electrodialyzed lithium chloride concentrate which has undergone deep ion-exchange purification is boiled down, thus increasing concentration of LiCl to 450-480 kg/m³ and salting out NaCl, KCl and Na₂B₄O₇.10H₂O crystals deeply due to their lower solubility. The boiled-down lithium chloride concentrate is diluted with demineralized water until a pregnant lithium chloride solution with a concentration of 350-380 kg/m³ is obtained, which is used to feed the anolyte during the procedure of producing a LiOH solution by membrane electrolysis of the pregnant lithium chloride solution (at a current density of 1-4 kA/m²), which is described by the following group of chemical reactions:

$$2LiCl+2H_2O \rightarrow 2LiOH+H_2\uparrow+Cl_2\uparrow \quad (16)$$

The membranes used are CTIEM-3, NAFION-424 or analogues thereof.

In this case, LiOH is formed in the cathode circuit of the membrane electrolyzer as a result of the following chemical reactions:

$$LiCl \rightarrow Li^+ + Cl^- \quad (17)$$

$$2H_2O+2e^- \rightarrow 2OH^- + H_2\uparrow \quad (18)$$

$$Li^+ + OH^- \rightarrow LiOH \quad (19)$$

Elemental chlorine is formed in the anode circuit of the membrane electrolyzer by the reaction:

$$2Cl^- - 2e^- \rightarrow Cl_2 \quad (20)$$

After cleaning from electrolyte drops and fog, the flow of anodic hydrogen is burned in a flow of anodic chlorine at a temperature of 1000-1100° C., producing hydrogen chloride by the reaction:

$$H_2 + Cl_2 \xrightarrow{t} HCl \quad (21)$$

When cooled, hydrogen chloride is absorbed in a stepwise manner by a countercurrent flow of demineralized water, with the output from the first absorption stage comprising commercial-grade hydrochloric acid with a concentration of 33-36% wt.

The process of electromembrane conversion of LiCl to LiOH is carried out in continuous anolyte circulation mode (LiCl solution of 150-170 kg/m³) with continuous withdrawal of a preset volume of catholyte and continuous supply of a preset volume of anolyte using a pregnant LiCl solution, thus ensuring the balance of material flows during membrane electrolysis. Membrane electrolysis is carried out at a current density of 1-4 kA/m² and a concentration of lithium chloride in the anolyte of 115-125 kg/m³, wherefor a pregnant supply solution of lithium chloride is fed into the circulating anode circuit of the electrochemical conversion system; the flow of used anolyte is subjected to chemical purification from sulfate ions and combined with the electrodialysis concentrate; the LiOH content in the lithium hydroxide solution obtained during electrochemical conversion is maintained within the range of 50-80 kg/m³. As impurities in the form of sulfate ions and boron accumulate in the circulating anolyte to critical levels, the volumetric flow of the anolyte, which stops a further increase in concentration of said impurities in the circulating anolyte, is removed from the electrolysis process and directed for decarbonization of the primary lithium concentrate. The inclusion of the nanofiltration procedure in the technological process of obtaining LiOH.H₂O from lithium-bearing brines, wherein over 90% of sulfate ions are removed from the primary lithium concentrate, allows to reduce the flow of the used anolyte by 90% compared to the prior art solution.

The flow of catholyte output in the course of electrolysis is boiled down in circulation mode while maintaining the LiOH concentration in the boiled-down solution at 125-130 kg/m³ at boiling temperature. A stable boiling down mode is ensured by continuous withdrawal of a preset volume of the boiled-down LiOH solution and by constant supply of catholyte. The withdrawn boiled-down LiOH solution is cooled in a crystallizer to a temperature of 60-65° C. and the resulting pulp is centrifuged, separating LiOH.H₂O crystals from the solution. The boiled-down catholyte centrate is recycled for boiling down, the LiOH.H₂O crystals are washed with demineralized water and dried under vacuum at a temperature of 60-70° C., thus obtaining high-purity commercial grade LiOH.H₂O. The resulting used washing solution is also recycled for boiling down by mixing it with the original catholyte. As the impurities in the form of sodium and potassium accumulate in the circulating stream of the evaporated catholyte to critical levels, a portion of the catholyte is continuously removed from the process in a volumetric flow, thus ensuring cessation of further increase in impurity levels in the catholyte. The flow of used boiled-down catholyte containing 5-10 kg/m³ of NaOH or less is used as a reagent for producing a LiHCO₃ solution by converting ion exchangers into the Li-form and for chemical purification of the electrodialyzed lithium concentrate from impurities. The impurities in the form of NaOH and KOH contained in the used boiled-down catholyte are removed from the process at the stage of boiling down the deeply purified lithium chloride concentrate before it is directed for dilution and electrolysis. The secondary steam condensate from boiling down is used as the demineralized water in the technological process.

If necessary, the disclosed technology provides for the production of battery-grade lithium carbonate along with the battery-grade LiOH.H₂O. In this case, the used boiled-down catholyte is used only for converting the ion exchanger into the Li-form and ensuring the required pH value in the chemical purification of the electrodialyzed lithium concentrate. The primary flow of used boiled-down catholyte is mixed with a circulating bicarbonate solution containing NaHCO₃, KHCO₃ and LiHCO₃, thus forming a mixed carbonate solution according to the following reaction:

$$HCO_3^- + OH^- \rightarrow H_2O + CO_3^{2-} \quad (22)$$

Highly soluble sodium and potassium carbonates remain in solution whereas poorly soluble lithium carbonate precipitates by the following reaction:

$$2Li^+ + CO_3^{2-} \rightarrow Li_2CO_3 \downarrow \quad (23)$$

To increase the yield of Li₂CO₃ and prevent dilution of the circulating bicarbonate solution, the precipitation of lithium carbonate is carried out in combination with the withdrawal of water from the reaction mixture in the form of water vapor in the process of contact of atmospheric air heated to a temperature above 100° C. with the reaction mixture. The volumetric flow rate of the heated air is set based on the required amount of removed water. The resulting Li₂CO₃ slurry in a carbonate solution is centrifuged to separate lithium carbonate from the solution. Lithium carbonate is washed with demineralized water, the resulting lithium-containing carbonate solution is directed for chemical purification of the electrodialyzed lithium concentrate either directly or through the process of producing a lithium bicarbonate solution used in the chemical purification. The resulting wet product is dried to obtain battery-grade commercial-grade lithium carbonate with purity of at least 99.9%. The mother carbonate liquor formed during $Li_2CO_3$ precipitation and the process of boiling down the carbonate pulp is transferred into a mixed bicarbonate solution by treatment with carbon dioxide according to the following reactions:

$$Na_2CO_3 + CO_2 + H_2O \rightarrow 2NaHCO_3 \quad (24)$$

$$K_2CO_3 + CO_2 + H_2O \rightarrow 2KHCO_3 \quad (25)$$

$$Li_2CO_3 + CO_2 + H_2O \rightarrow 2LiHCO_3 \quad (26)$$

Due to the significantly lower solubility of $NaHCO_3$ and $KHCO_3$ compared to that of $Na_2CO_3$ and $K_2CO_3$ (more than 300 kg/m$^3$), in the established mode of the process of obtaining $Li_2CO_3$ from the used boiled-down catholyte, the content of $NaHCO_3$ and $KHCO_3$ in the bicarbonate solution formed after carbonization of the carbonate solution exceeds the limit of solubility for said salts and a portion of the produced $NaHCO_3$ and $KHCO_3$ bicarbonates is converted into the solid phase. However, $LiHCO_3$ content in a bicarbonate solution will never exceed the solubility limit for said compound (63 kg/m$^3$), since the concentration of $Li_2CO_3$ in the bicarbonate solution directed for carbon dioxide treatment does not exceed 10 kg/m$^3$. The precipitate consisting of $NaHCO_3$ and $KHCO_3$ crystals is separated from the mixed circulating bicarbonate solution, the circulating bicarbonate solution is directed for mixing with the used boiled-down catholyte, and the crystals of $NaHCO_3$ and $KHCO_3$ are washed with demineralized water; the resulting used washing solution is directed for precipitation of $Li_2CO_3$ and for boiling down the resulting slurry. The produced $NaHCO_3$ and $KHCO_3$ crystals are used in industrial applications as washing reagents and water softening reagents. If there is no need for an industrial use thereof, said crystals can be converted using a solution of hydrochloric acid into a chloride solution which is mixed with the lithium-free mother liquor.

The disclosed invention in the embodiment including producing, along with $LiOH.H_2O$, a commercial product in the form of battery-grade $Li_2CO_3$ allows to reduce the consumption of hydrochloric acid for in-house needs by over 10%, to reduce the consumption of reagents used for purifying solutions by 60-90%, and to reduce power consumption by 2-3% by reducing lithium-containing circulating flows directed for membrane electrolysis in the form of additives to the catholyte and the anolyte.

If the production of $Li_2CO_3$ as a commercial product is not required, the lithium carbonate purified from impurities can be converted into the anolyte composition using hydrochloric acid by the following reaction:

$$Li_2CO_3 + HCl \rightarrow 2LiCl + H_2O + H_2O + CO_2 \quad (27)$$

In the following description, the invention is illustrated using specific examples.

Example 1. An industrial testing apparatus for sorption extraction of a primary lithium concentrate used thereafter for lithium hydroxide monohydrate production from a natural lithium-bearing multicomponent brine with total mineralization of 486 kg/m$^3$ and LiCl content of 1.18 kg/m$^3$ was used to carry out comparative tests of sorption-desorption modules (SDM) consisting of two columns filled with granular DGAL-Cl sorbent per module, with a mass content of 8.15 tons of sorbent in each column. During the tests, SDM 1 (prior art) worked on the original unfiltered lake brine. SDM 2 worked on a similar lake brine previously subjected to a filtering process according to the disclosed method. During the tests, the hydraulic resistance of the module columns and the specific productivity of 1 ton of loaded sorbent were monitored in terms of the resulting $LiOH.H_2O$ product. During the tests, the hydraulic resistance of the SDK 1 columns increased from the initial value of 0.6 atm to the critical value of 2.8 atm after 97 days of continuous operation. The operation was halted, the sorbent was unloaded, the sorbent and drainage systems were washed, the sorbent was loaded again, and tests were resumed. The next increase in the hydraulic resistance of the SDK 1 columns to the critical level occurred after 79 days of continuous operation. Over the entire testing period, the resistance of the SDM 2 columns increased by 5-7% over the first five days of testing and then remained stable until the conclusion of testing. The specific annual productivity of 1 ton of sorbent in terms of $LiOH.H_2O$ in the composition of SDM 2 was 3018 kg, and the same for 1 ton of sorbent in the composition of SDM 1 was 3562 kg. Thus, the removal of the solid phase of impurities from lithium-bearing natural brine allows to increase the specific annual productivity of each ton of loaded sorbent by 18%.

Example 2. A pilot apparatus was used to carry out comparative tests for obtaining lithium hydroxide monohydrate from pregnant (filtered) lithium-bearing brine of magnesium chloride type with lithium chloride content of 1.24 kg/m$^3$ using the prior art method and the disclosed method. The pilot apparatus comprised two sorption-desorption modules (SDM) with a total selective DGAL-Cl granular sorbent load of 66.2 kg per module. The process of producing primary lithium concentrate from brine in one of the modules was implemented according to prior art, and it was implemented according to the proposed method in the other module. The total duration of the comparative tests was 1440 hours. During the tests, aluminum content in mother liquor flows was monitored. 436111.6 dm$^3$ of pregnant (purified from suspended particles) natural brine was processed in each of the modules during this time period. The primary lithium concentrate produced using the disclosed method was subjected to nanofiltration. The results are presented in Table 1.

It clearly follows from the results that with the same flow of lithium brine being processed, the yield of LiCl into the primary lithium concentrate according to the prior art solution is 44.31 kg, and the yield according to the disclosed method is 48.62 kg, that is, the specific volumetric consumption of lithium-bearing pregnant brine per 1 kg of LiCl isolated from brine according to the prior art solution (984.24 dm$^3$/kg) is 9.7% higher than that according to the disclosed method (896.98 dm$^3$/kg). At the same time, impurity content of brine macrocomponents according to the disclosed method is lower than that in a similar intermediate product produced using the prior art method by 10% or more.

TABLE 1

Preliminary test results of the process for producing primary lithium concentrate

| Raw material, intermediate product | Ingredient content, g/dm³ | | | | | | | | Brine volume, intermediate product, dm³ | Production method |
|---|---|---|---|---|---|---|---|---|---|---|
| | LiCl | MgCl₂ | CaCl₂ | NaCl | KCl | SO₄ | B | $\Sigma_{salts}$ | | |
| Pregnant brine | 1.24 | 434 | 12.8 | 3.5 | 4.3 | 18.2 | 5.6 | 487 | 43611.8 | prior art |
| | 1.191 | 434 | 12.8 | 3.5 | 4.3 | 18.2 | 5.6 | 487 | 43611.3 | disclosed |
| Primary lithium concentrate | 4.02 | 9.14 | 0.38 | 0.08 | 0.10 | 0.43 | 0.19 | 14.34 | 11022.39 | prior art |
| | 3.98 | 8.11 | 0.28 | 0.06 | 0.08 | 0.34 | 0.10 | 12.95 | 12215.74 | disclosed |
| Nanofiltrate | | | no procedure | | | | | | — | prior art |
| | 4.01 | 0.79 | 0.13 | 0.07 | 0.10 | 0.03 | 0.02 | 5.15 | 11524.28 | disclosed |

Further, the results confirm purification of primary lithium concentrate by nanofiltration from magnesium by 90.8%, from calcium by 56.4%, from sulfate ions by 91.6% in accordance with the disclosed method.

The loss of lithium into the used nanofiltration solution is 5% at most, reducing the yield of LiCl from 48.62 kg into the primary lithium concentrate to 46.21 kg, which still remains 4.3% higher than that in the prior art method. Taking into account the significant reduction in the consumption of reagents for purification from magnesium, calcium and sulfate ions, the process of producing primary lithium concentrate according to the disclosed method provides a significant advantage. Periodic monitoring of the aluminum content in the mother liquor flows at the outlet of the SDMs showed the absence of aluminum content in the SDM mother liquor flow operating according to the disclosed method and the presence of aluminum of 0.6-0.8 mg/dm³ in the SDM mother liquor flow operating according to the prior art method.

Example 3. A pilot apparatus comprising an electrolysis assembly based on a bipolar membrane electrolyzer with CTIEM-3 membranes, titanium anodes with ruthenium oxide coating and stainless steel cathodes was used to produce lithium hydroxide monohydrate from a flow of primary lithium concentrate that has undergone nanofiltration purification (Example 2) in accordance with the disclosed method. During membrane electrolysis carried out at a current density of 3.9 A/dm², 432.38 dm³ of catholyte was obtained containing 60.34 g/dm³ of LiOH. After boiling down and crystallization of LiOH.H₂O, washing and drying the crystals, the yield of the commercial-grade product in the form of LiOH.H₂O was 39.158 g. 3.714 kg of LiOH in the form of a boiled-down solution with LiOH concentration of 120 g/dm³ was used for in-house needs (chemical purification from impurities, ion exchanger regeneration). Thus, 14.2% of the produced amount of lithium alkali was consumed for in-house needs.

Compared to the disclosed method, when producing high-purity LiOH.H₂O according to the prior method, 14 times as much lithium alkali is required for in-house needs. In this regard, the specific power consumption per 1 kg of the product produced using the prior art method is 2.2 times higher than that for the disclosed method.

The consumption of barium chloride for chemical purification of lithium concentrate from sulfate ions according to the disclosed method was 0.751 kg (19.2 g per 1 kg of commercial-grade LiOH.H₂O), which is 13.5 times lower than that for the prior art method. Reducing the consumption of reagents provides a proportional decrease in the mass amount of solid waste.

The chemical composition of LiOH.H₂O obtained from natural lithium-bearing brine (according to the disclosed method) is presented in Table 2.

TABLE 2

Composition of LiOH•H₂O obtained from natural lithium-bearing brine according to the disclosed method

| | Substance, element, factor | | | | | | | | | | |
|---|---|---|---|---|---|---|---|---|---|---|---|
| | LiOH | CO₃— | Na | K | Fe | Ca | Mg | Al | Si | Pb | Cl | SO₄ |
| Content, % wt. | 57.09 | 0.32 | 0.0006 | 0.001 | 0.0001 | <0.001 | <0.001 | <0.001 | <0.001 | <0.0005 | < 0.002 |

As follows from the contents of Table 2, the lithium hydroxide monohydrate (LiOH.H₂O) product obtained using the disclosed method meets the requirements of LGO-1 GOST 8595-83.

Example 4. The pilot apparatus described in Examples 2 and 3 was used for producing 24.498 kg of LiOH from 33586.4 dm³ of natural brine of chloride-magnesium type according to the disclosed method in the form of a solution with a volume of 401.34 dm³ and LiOH content of 61.04 g/dm³. 52.239 dm³ thereof was spent on in-house needs. The rest of the volume was directed for production of lithium hydroxide monohydrate. In the process of boiling down and crystallization, 31.202 kg of commercial-grade LiOH.H₂O and 28.967 dm³ of boiled-down used (contaminated with K and Na) catholyte (composition: LiOH—120.1 g/dm³; KOH—5.4 g/dm³; NaOH—3.9 g/dm³) was produced. The boiled-down used catholyte was used for production of battery-grade lithium carbonate according to the disclosed method (claim 2). As a result of processing the boiled-down used catholyte, 5.363 kg of Li₂CO₃, 0.278 kg of KHCO₃ and 0.237 kg of NaHCO₃ was produced. The chemical composition of the resulting lithium carbonate is shown in Table 3.

TABLE 3

Chemical composition of lithium carbonate produced from boiled-down used catholyte by boiling down the catholyte and LiOH•H$_2$O crystallization

| Substance, element | Li$_2$CO$_3$ content, % wt. | Impurity content, $10^{-4}$ % wt. | | | | | | | | | | | | | | |
|---|---|---|---|---|---|---|---|---|---|---|---|---|---|---|---|---|
| | | Al | Ba | Ca | Mg | Na | K | Fe | Co | Ni | Cu | Si | Pb | Zn | Mn | Cl | F |
| Percentage | >99.9 | 1.0 | 0.3 | 8 | 2 | 3 | 4 | 1 | <1 | <1 | <0.1 | <1 | <0.5 | <2 | <0.5 | < | <3 |

It clearly follows from the contents of Table 3 that the resulting lithium carbonate qualifies for the 99.99% grade in terms of the residual impurity content.

In the obtained by-products in the form of a mixture of potassium and sodium bicarbonates, lithium is present as an impurity, the content of which is less than 0.0004% wt.

Example 5. Using the pilot apparatus (Examples 2, 3), in the process of producing LiOH.H$_2$O from lithium-bearing natural brine according to the disclosed method, the flows of cathodic hydrogen (0.755 g/h) and anodic chlorine (26.81 g/h), formed as by-products of membrane electrolysis were burned in a special purpose carbon-graphite furnace (at a temperature of 1100° C.), thus obtaining a flow of gaseous hydrogen chloride. The hydrogen chloride flow was forcedly cooled to dewpoint temperature (78° C.) by direct contact with a concentrated HCl solution. The cooled flow of hydrogen chloride passed three-stage countercurrent absorption by demineralized water. The commercial-grade hydrochloric acid extraction was carried out from the first stage, the absorbent was replenished with demineralized water at the third (sanitary) absorption stage. The production rate of the apparatus in terms of hydrochloric acid with concentration of 35.7% was 77.1 kg/h.

REFERENCES

1. FRG patent 2700748, 8 Sep. 77.
2. RU patent 2470861, Apr. 9, 2009, published 27 May 12, bulletin 15.
3. RU patent 2516538, Feb. 17, 2012, published 20 May 14, bulletin 14.
4. RU patent 2455063, Oct. 13, 2010, published 10 Jul. 12, bulletin 19.
5. RU patent 2193008, Mar. 25, 1998, published 20 Nov. 2, bulletin 32.
6. RU patent 2656452, Feb. 4, 2016, published 5 Jun. 18, bulletin 16.

The invention claimed is:

1. A method for producing lithium hydroxide monohydrate from multicomponent lithium-bearing brines, the method including:
   (i) filtering the multicomponent lithium-bearing brine from solid-phase impurities to form a pregnant lithium-bearing brine,
   (ii) sorption separation of primary lithium concentrate from pregnant lithium-bearing brine in sorption-desorption columns with a fixed bed of a granular sorbent selective to LiCl in the form of an aqueous solution,
   (iii) decarbonizing the primary lithium concentrate by acidification to form a decarbonated primary lithium concentrate
   (iv) nanofiltration of the decarbonated primary lithium concentrate for non-reactive purification from magnesium, calcium and sulfate ions,
   (v) reverse osmosis concentration of the primary lithium concentrate purified by nanofiltration to obtain a permeate flow in the form of a demineralized aqueous solution and a reverse osmosis lithium chloride concentrate flow,
   (vi) concentration of the reverse osmosis lithium chloride concentrate by electrodialysis to obtain a lithium-containing dialysate flow and an electrodialyzed lithium chloride concentrate flow,
   (vii) chemical purification of the electrodialyzed lithium chloride concentrate from calcium, magnesium and sulfate ions,
   (viii) ion-exchange purification of the chemically purified electrodialyzed lithium chloride concentrate,
   (ix) boiling down the electrodialysis lithium chloride concentrate subjected to ion-exchange purification with salting out and separation of sodium chloride and potassium chloride crystals,
   (x) producing a pregnant lithium chloride solution by diluting the boiled-down lithium chloride concentrate with demineralized water,
   (xi) electrochemical conversion by membrane electrolysis of the pregnant lithium chloride solution to produce cathodic hydrogen, anodic chlorine, and an aqueous solution of lithium hydroxide as catholyte,
   (xii) boiling down the LiOH solution,
   (xiii) crystallization of LiOH.H$_2$O from the boiled-down LiOH solution.

2. The method according to claim 1, wherein a portion of the pregnant lithium-bearing flow obtained during filtration stage (i) is used to regenerate used filters, wherein the obtained used filter regenerate is supplied for clarification, thus obtaining a clarified regenerate which is mixed with the original multicomponent lithium-bearing brine directed to filtering, and obtaining a thickened regenerate which is subjected to sedimentation centrifugation.

3. The method according to claim 2, wherein a concentrate formed by sedimentation centrifugation of the thickened regenerate is mixed with the clarified regenerate which is directed for mixing with the original multicomponent lithium-bearing brine, and a sediment of solid-phase impurities is discharged during centrifugation and buried.

4. The method according to claim 1, wherein the sorption separation stage (ii) of the primary lithium concentrate comprises:
   passing the pregnant lithium-bearing brine in filtration mode through the bed of granular sorbent in a column until a breakthrough LiCl concentration is achieved in the flow at the column outlet,
   stopping filtration of the brine through the bed of granular sorbent saturated with LiCl,
   displacing the pregnant brine remaining in the column from the column by circulating lithium-containing washing liquid, filtering a preset volume of fresh water through the sorbent layer in the column, thus producing a flow of primary lithium concentrate.

5. The method according to claim 4, wherein the pregnant brine remaining in the column is displaced from the column by the first portion of the circulating lithium-containing washing liquid and is mixed with the pregnant lithium-bearing brine, and the first portion of the used lithium-containing washing liquid in the column is displaced by a second portion of lithium-containing washing liquid and mixed with the pregnant lithium-bearing brine,
wherein a number of portions is determined by a preset level of residual content of impurities of the brine in the sorbent in the column,
fresh water is used as the last portion of the washing liquid, and
the second and subsequent portions of lithium-containing washing liquid are used in a next cycle of displacement of the brine from the bed of a granular sorbent saturated with LiCl.

6. The method according to claim 4, wherein a fine fraction of the sorbent contained in the flows of a lithium-free mother liquor, in the flows of the pregnant lithium-bearing brine displaced from the sorbent bed and in the flows of the used lithium-containing washing liquid is removed by filtering each of said flows on fine filters, and fine particles of the selective sorbent captured on the filters are recycled for production of selective granular sorbent.

7. The method according to claim 1, wherein the granular sorbent in the sorption-desorption columns at stage (ii) is a granular sorbent based on $LiCl.2Al(OH)_3.mH_2O$.

8. The method according to claim 1, wherein a waste flow obtained in stage (iv) of nanofiltration and enriched with magnesium and calcium is mixed with pregnant lithium-bearing brine.

9. The method according to claim 1, wherein the flow of lithium-containing dialysate produced during electrodialysis concentration stage (vi) is mixed with the primary lithium concentrate prior to reverse osmosis concentration stage (v).

10. The method according to claim 1, wherein the chemical purification of the electrodialyzed lithium chloride concentrate from calcium, magnesium and sulfate ions in stage (vii) includes:
mixing electrodialyzed lithium chloride concentrate with used alkaline regenerate, barium chloride, and a lithium bicarbonate solution produced by treating a preset volume of boiled-down used catholyte with carbon dioxide, to precipitate impurities as a sediment,
separating of the chemically purified electrodialyzed lithium chloride concentrate from the produced sediment of impurities by filtering,
and washing the precipitated sediment with demineralized water, wherein the produced waste washing solution is mixed with the main flow of the primary lithium concentrate purified by nanofiltration, and the chemically purified electrodialyzed lithium chloride concentrate is directed for deep ion-exchange purification from the residual impurities.

11. The method according to claim 1, wherein the ion-exchange purification stage (viii) is carried out using an ion exchanger, after acidification of the chemically purified electrodialyzed lithium chloride concentrate with hydrochloric acid to pH=6-8; wherein the used ion exchanger is regenerated with a hydrochloric acid solution, producing a used acidic regenerate; the used acidic regenerate is used as an auxiliary acidifying agent in decarbonization of the primary lithium concentrate prior to its nanofiltration, wherein the ion exchanger regenerated with a hydrochloric acid solution is converted to the Li-form using a preset volume of used boiled-down catholyte, producing a used alkaline regenerate; and wherein the resulting used alkaline regenerate is directed as a reagent for chemical purification of the electrodialyzed chloride lithium concentrate.

12. The method according to claim 1, wherein the separation stage (ix) of crystals salted out from the lithium chloride concentrate that has passed deep ion exchange purification and electrodialysis is carried out by centrifugation followed by washing with a preset volume of water distilled from the lithium-containing mother liquor during the boiling down of the purified electrodialyzed lithium chloride concentrate, and mixing the formed used lithium-containing solution with purified electrodialyzed lithium chloride concentrate prior to boiling down thereof.

13. The method according to claim 1, wherein the cathodic hydrogen flow produced by membrane electrolysis (xi) and purified from residual catholyte is burned in an anodic chlorine stream purified from residual anolyte thus forming hydrogen chloride which is cooled to produce concentrated hydrochloric acid by water absorption.

14. The method according to claim 1, wherein the flow of used anolyte output during electrolysis and contains sulfate ions, and is directed as the main acidifying agent for decarbonization of the primary lithium concentrate.

15. The method according to claim 11, wherein the electrodialyzed lithium concentrate is alkalinized to a pre-determined pH value during step (vii) of chemical purification using preset volumes of the used boiled-down catholyte; and wherein after using preset volumes of the used boiled-down catholyte to convert the ion exchanger into the Li-form, the remaining catholyte is directed for mixing with a bicarbonate circulating solution containing $NaHCO_3$, KHCO3 and LiHCO3, forming a slurry of Li2CO3 and a carbonate solution of Na2CO3, K2CO3 and Li2CO3; the Li2CO3 slurry formed during mixing in the carbonate solution of Na2CO3, K2CO3 and Li2CO3 is concentrated by removing a preset amount of water from the slurry by bubbling a preset volume of atmospheric air heated above 100° C. through the slurry; the solid phase of the produced lithium carbonate is separated from the boiled-down carbonate solution by centrifugation; the carbonate solution is treated with carbon dioxide until the carbonates are fully converted into bicarbonates, forming precipitates of sodium and potassium bicarbonates; the resulting precipitated sodium and potassium bicarbonates are filtered off and washed with demineralized water, the formed used lithium-containing bicarbonate solution is directed for mixing with the used boiled-down catholyte, and the obtained lithium carbonate is washed with demineralized water, dried, and packaged to produce battery-grade lithium carbonate.

16. The method according to claim 2, wherein the granular sorbent in the sorption-desorption columns at stage (ii) is a granular sorbent based on $LiCl.2Al(OH)_3.mH_2O$.

17. The method according to claim 3, wherein the granular sorbent in the sorption-desorption columns at stage (ii) is a granular sorbent based on $LiCl.2Al(OH)_3.mH_2O$.

18. The method according to claim 4, wherein the granular sorbent in the sorption-desorption columns at stage (ii) is a granular sorbent based on $LiCl.2Al(OH)_3.mH_2O$.

19. The method according to claim 5, wherein the granular sorbent in the sorption-desorption columns at stage (ii) is a granular sorbent based on $LiCl.2Al(OH)_3.mH_2O$.

20. The method according to claim 6, wherein the granular sorbent in the sorption-desorption columns at stage (ii) is a granular sorbent based on $LiCl.2Al(OH)_3.mH_2O$.

\* \* \* \* \*